United States Patent
Combes et al.

(10) Patent No.: US 7,107,050 B2
(45) Date of Patent: Sep. 12, 2006

(54) RESOURCE MANAGER FOR A SATELLITE TELECOMMUNICATION SYSTEM

(75) Inventors: Stéphane Combes, Toulouse (FR); Tarif Zein Al-Abedeen, Castanet (FR); Jean-Didier Gayrard, Toulouse (FR)

(73) Assignee: Alcatel, Paris (FR)

( * ) Notice: Subject to any disclaimer, the term of this patent is extended or adjusted under 35 U.S.C. 154(b) by 289 days.

(21) Appl. No.: 10/372,845

(22) Filed: Feb. 26, 2003

(65) Prior Publication Data

US 2003/0166401 A1  Sep. 4, 2003

(30) Foreign Application Priority Data

Mar. 4, 2002  (FR) .................................. 02 02701

(51) Int. Cl.
*H04Q 7/20* (2006.01)

(52) U.S. Cl. .................... 455/427; 455/12.1; 455/13.1; 455/13.2; 455/428; 455/450; 455/451; 455/452.1; 455/453; 370/310.1; 370/325; 370/395.2; 370/395.21; 370/395.43

(58) Field of Classification Search ............... 455/12.1, 455/13.1–13.2, 427–430, 450, 451, 452.1–452.2, 455/453; 370/310.1, 325, 395.2–395.21, 370/395.43
See application file for complete search history.

(56) References Cited

U.S. PATENT DOCUMENTS

| | | | | |
|---|---|---|---|---|
| 5,826,169 A | * | 10/1998 | Natarajan | .................. 455/13.1 |
| 6,178,169 B1 | * | 1/2001 | Hodgkinson et al. | .. 370/395.52 |
| 6,310,893 B1 | * | 10/2001 | Yuan et al. | .................. 370/474 |
| 6,366,761 B1 | * | 4/2002 | Montpetit | .................. 455/12.1 |
| 6,404,749 B1 | * | 6/2002 | Falk | .......................... 370/325 |
| 6,445,707 B1 | * | 9/2002 | Iuoras et al. | ........... 370/395.43 |
| 6,707,800 B1 | * | 3/2004 | Peyrovian et al. | ....... 370/310.1 |
| 6,813,271 B1 | * | 11/2004 | Cable | ...................... 370/395.1 |

FOREIGN PATENT DOCUMENTS

| | | |
|---|---|---|
| EP | 1104124 A1 | 5/2001 |
| EP | 1158701 A2 | 11/2001 |
| GB | 23324435 A | 10/1998 |

* cited by examiner

*Primary Examiner*—Steve M. D'Agosta
(74) *Attorney, Agent, or Firm*—Sughrue Mion, PLLC

(57) ABSTRACT

A resource manager for a satellite telecommunication system including user terminals sending data to spots via a satellite, all data streams from a given terminal to the same given destination spot constituting a virtual path comprising a set of uplinks from the terminal to the satellite and a set of downlinks from the satellite to the spot, includes a central entity associated with each satellite for receiving requests sent by the user terminals and each expressing a requirement to use resources of the satellite corresponding to the virtual path. The central entity groups the requests into request groups each associated with a set of uplinks from the same spot to the destination spot, the set of uplinks constituting a virtual link, and determines authorized resources for each request group.

6 Claims, 4 Drawing Sheets

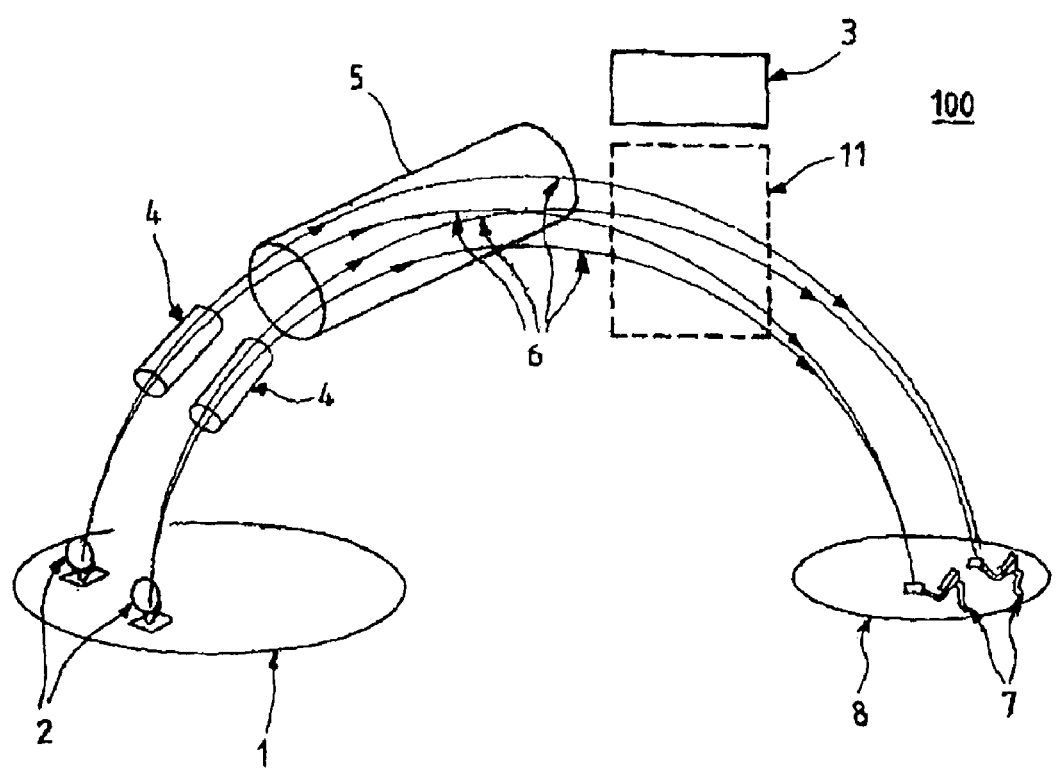

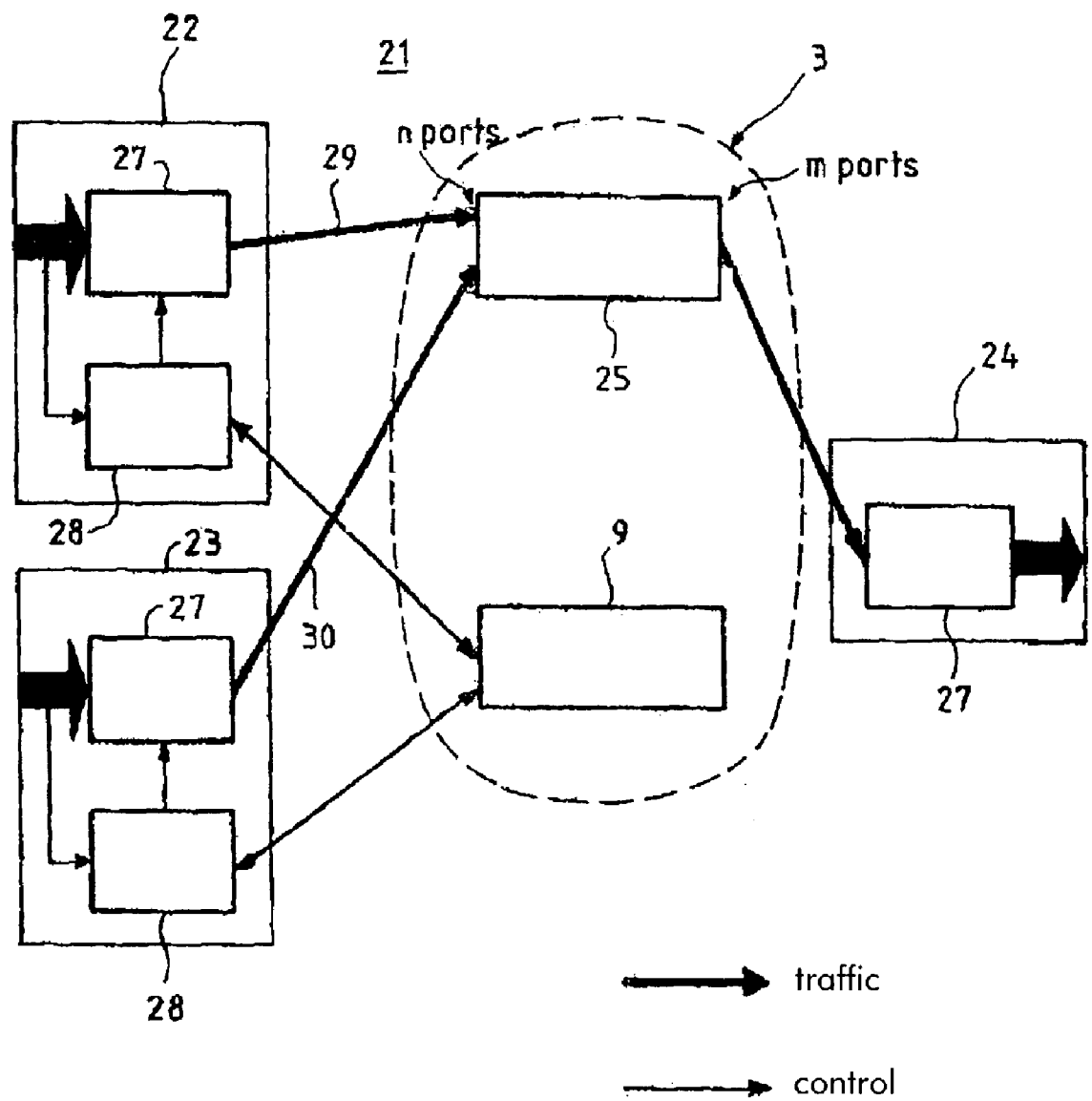
FIG_2

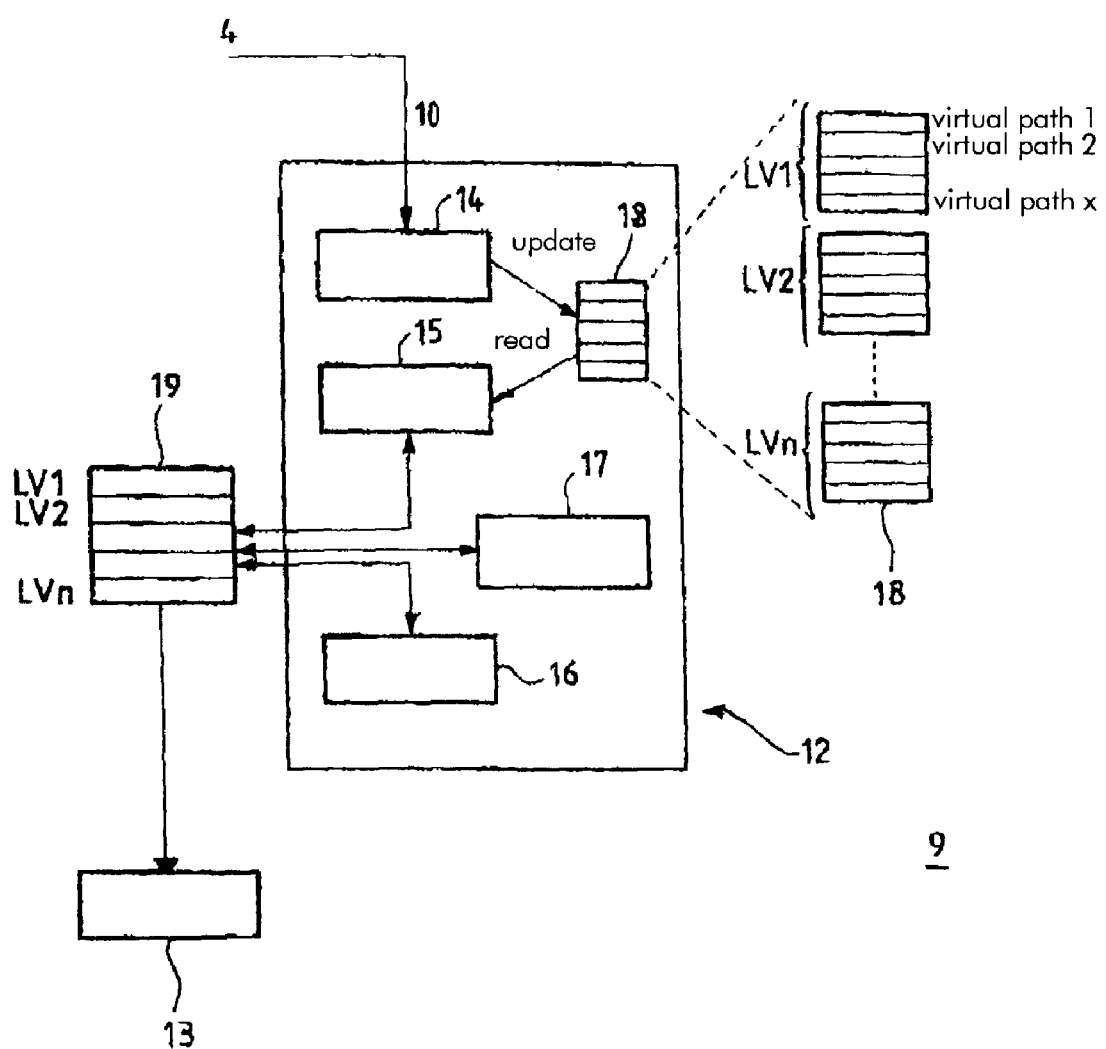

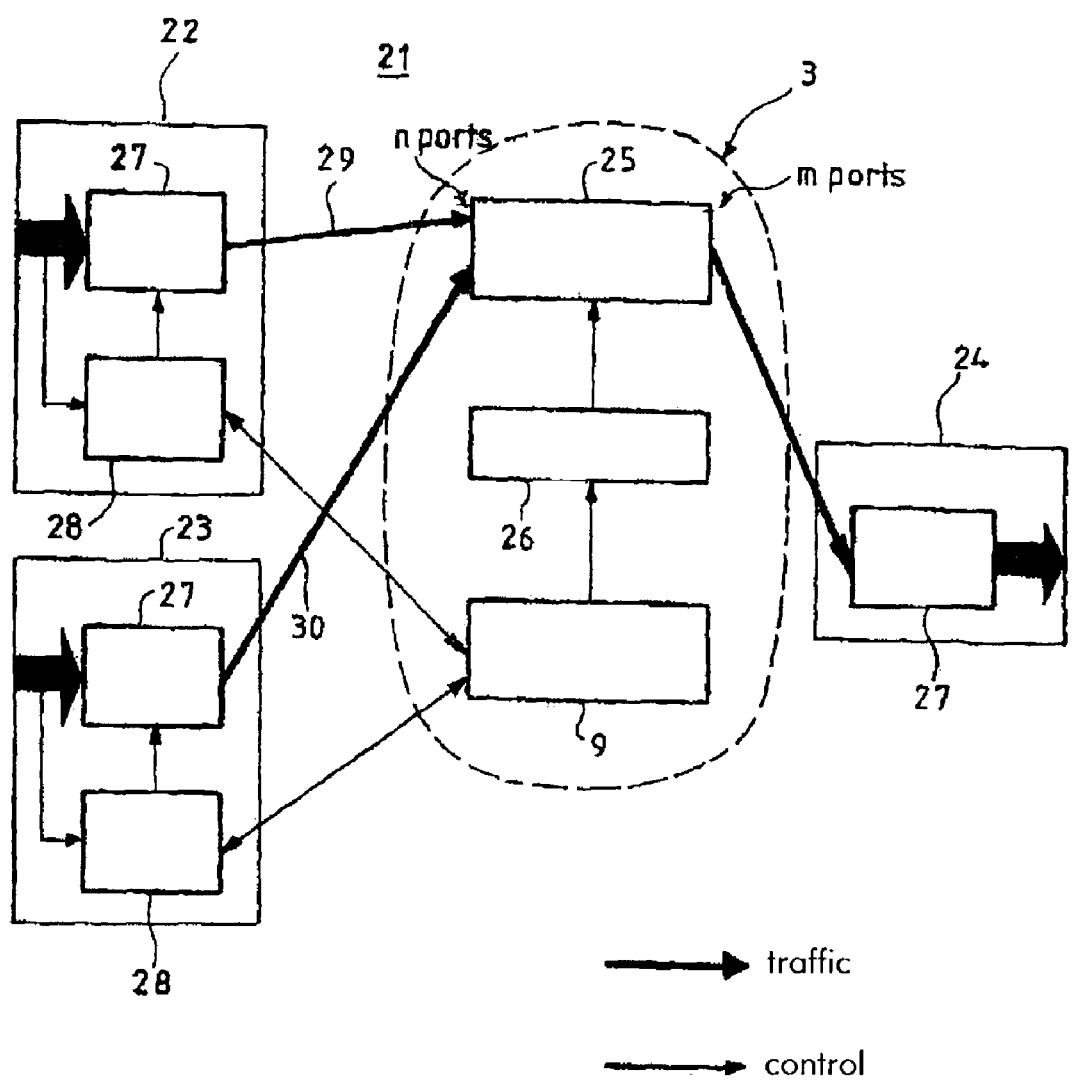
FIG_4

RESOURCE MANAGER FOR A SATELLITE TELECOMMUNICATION SYSTEM

CROSS-REFERENCE TO RELATED APPLICATIONS

This application is based on French Patent Application No. 02 02 701 filed Mar. 4, 2002, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a resource manager for a multispot or multibeam satellite telecommunication system including user terminals sending data to a plurality of spots each representing the intersection with the surface of the Earth of a satellite beam representing the radiation diagram of an antenna of the satellite. This type of satellite allows the use of a plurality of satellite antenna beams to cover contiguous geographical areas, instead of a single wide beam. The present invention is more particularly suited to systems using a satellite or satellites to provide up to several tens of spots (from around 10 spots to around 100 spots). Such systems hove an increased capacity because of the improved link balance obtained with narrow beams and the facility to reuse frequencies between the beams.

2. Description of the Prior Art

As shown in FIG. 1, a telecommunication system 100 of the above kind includes user terminals 2, 7 in the form of ground stations communicating with each other via a satellite 3 on board which is an onboard switch 11. The onboard switch 11 receives at its input ports uplinked data, i.e. data that is uplinked from the various ground stations 2 to the satellite 3, and distributes from its output ports downlinked data, i.e. data downlinked from the satellite 3 to other ground stations 7. The terminals 2 that send to the same input port of the switch 11 are grouped in the same spot 1. Similarly, the terminals 7 that receive data from the same output port of the switch 11 are grouped into a spot 8. The satellite 3 routes traffic directly between the spots 1 and 8 by means of the onboard switch 11, which minimizes the use of terrestrial networks. The terminals 2 are very often in competition for use of the resources consisting of the uplink and downlink bandwidth of the satellite 3.

Many devices known in the art provide a solution to the problem of dynamic management of the resources of a satellite system authorizing dynamic connectivity between spots via the satellite.

One solution is to use a demand assignment multiple access (DAMA) controller based on a protocol for dynamic assignment of resources and which assigns user terminals frequency and time slots when said terminals express the requirement to send data in the form of packets on uplinks from a terminal to a satellite by sending requests to the DAMA controller. An onboard switch on the satellite then distributes the data packets arriving on a plurality of uplinks to a plurality of downlinks. The onboard switch can be of two types. The first type is a packet switch. It routes each data burst or packet individually as a function of routing information transmitted with the packet itself or in a separate control channel. The second type is a circuit switch. It routes received signals or information as a function of its time and frequency position on the uplink. A circuit switch effects deterministic multiplexing. The time and frequency position of signals or information received on each uplink must therefore conform to the routing configuration of the switch. A packet switch effects statistical multiplexing at each of its outputs. Thus it can happen that many packets have the same output of the switch as their destination: this results in conflict. The conflict is resolved by means of a buffer memory.

However, the buffer memory has a limited capacity. If that capacity is exceeded, a phenomenon known as congestion results.

A first solution to this problem is to increase the size of the buffer memory, but this requires memories of very high capacity, and therefore represents a penalty in terms of mass and power consumption on board a satellite.

The document FR2811841 describes a solution to the above problem.

To this end, it includes a congestion control device which receives requests sent by user terminals from the satellite concerned, each request expressing a requirement to use resources of the satellite; the request combines all the requirements of a given terminal with respect to a given destination spot. This set of requirements is referred to as a virtual path. Virtual paths 4 are shown in FIG. 1 and constitute all of the stream of data from a given terminal 2 to the same destination spot 8. The congestion control device then uses the requests that it receives to determine the resources authorized for each virtual path, taking into account the available resources at the outputs of the switch. The authorized resources are then supplied to a DAMA controller which allocates resources to the user terminals on the uplinks from the terminal to the satellite. The congestion control device therefore takes a preventive approach to congestion.

However, problems arise from its use. Computing authorized bit rates for each request associated with a virtual path leads to a long computation processing time.

Also, the interaction between the congestion control device and the DAMA controller is relatively complex; this is because data is exchanged each time that a request is received from a terminal.

Furthermore, if a new request corresponding to a virtual path is received by the congestion control device, it must be fully satisfied if the capacity of the output of the switch allows this. This approach can give too high a priority to the most recent request because, if the congestion control device authorizes a large quantity of resources in response to a request from a first terminal, the next request from another terminal cannot be fully satisfied unless the first terminal has not sent another request. This phenomenon can lead to unfair distribution of authorized resources.

The present invention aims to provide a resource manager for a satellite telecommunication system which limits the computation processing time and the complexity of exchanges between the congestion controller and the DAMA controller and avoids the unfair distribution of authorized resources.

SUMMARY OF THE INVENTION

To this end, the present invention proposes a resource manager for a satellite telecommunication system including user terminals sending data to spots via a satellite, all data streams from a given terminal to the same given destination spot constituting a virtual path comprising a set of uplinks from the terminal to the satellite and a set of downlinks from the satellite to the spot, the manager including a central entity associated with the satellite and including means for receiving requests sent by the user terminals and each expressing a requirement to use resources of the satellite corresponding to the virtual path, in which resource manager the central entity includes means for grouping the requests into request groups each associated with a set of uplinks from the same spot to the destination spot, the set of uplinks constituting a virtual link, and means for determining authorized resources for each request group.

Thanks to the invention, the grouping of requests into request groups reduces the computation processing time and the complexity of exchanges of data between the congestion controller and the DAMA controller, since the authorized resources are sent to the DAMA controller for each request group, rather than for each request.

Furthermore, this grouping provides fairer processing of requests since resources are determined for the set of requests rather than for each individual request.

The central entity advantageously includes means for distributing on the virtual link resources that remain available after determination of the authorized resources and means for determining new authorized resources modified as a function of the distribution of resources still available for each of the virtual links. It is therefore possible to process first the distribution of the dynamic resource assigned as a function of the requests from the terminals and then the distribution of the resources available after fully distributing the dynamic resources.

The resource manager advantageously includes means for assigning resources of the satellite to user terminals associated with the same virtual link as a function of the authorized resources or the modified authorized resources. These means constitute the dynamic resource assignment DAMA controller which assigns the user terminals frequencies or time intervals so that they can send their data.

The present invention also proposes a method of managing resources implemented in a resource manager according to the invention, which method includes a first step of distributing a portion of the resources of the satellite associated with the downlinks used by the downlink streams to the same spot between the virtual links associated with the same spot as a function of a weighting parameter associated with each virtual link in order to generate authorized resources associated with each virtual link.

The above method advantageously includes a second step of distributing the portion of the resources of the satellite associated with the uplinks used by the uplink streams from the same spot between the authorized resources associated with the same spot as a function of a weighting parameter associated with each of the authorized resources so as to generate modified authorized resources associated with each of the authorized resources. The first distribution step of the method can lead to assignment of resources associated with a downlink of the satellite to a virtual link that cannot use the resources fully because the uplink of the virtual link is saturated: the other uplinks are then unable to exploit (surplus) resources assigned to the aforementioned virtual link. The second distribution step determines a new set of authorized resources taking the uplinks into account, in order to avoid assigning resources that cannot be used.

In one embodiment, the method includes a third step of distributing the resources of the satellite still available after the first and second distribution steps to constitute authorized resources modified as a function of the distribution of resources still available for each of the virtual links.

At least one of said distribution steps is advantageously repeated.

The present invention further provides a data transmission system including user terminals and a satellite including a dynamic circuit switch and a controller for the switch, which system includes a resource manager according to the invention sending data routing set-up instructions to the controller. Thus, in addition to its preventive role, the resource manager can send data to the switch controller, which advises the switch of route set-up instructions on the basis of that data.

Other features and advantages of the present invention will become apparent in the course of the following description of one embodiment of the invention, which description is given by way of illustrative and non-limiting example.

BRIEF DESCRIPTION OF THE DRAWINGS

FIG. 1 shows a system conforming to the invention for transmitting data via satellite between two geographical areas.

FIG. 2 shows a data transmission system conforming to the invention using a resource manager.

FIG. 3 shows the architecture of the resource manager conforming to the invention.

FIG. 4 shows a data transmission system like that shown in FIG. 2, using a dynamic circuit switch conforming to the invention.

DETAILED DESCRIPTION OF THE PREFERRED EMBODIMENT

Elements common to more than one figure are identified by the same reference number in all figures in which they appear.

FIG. 1 has already been partly described in connection with the prior art and also shows a set of data streams 5, referred to as a virtual link, coming from the same spot 1 and going to the same spot 8.

FIG. 2 shows a data transmission system 21 including a plurality of terminals 22, 23 and 24 and a satellite 3. The satellite 3 includes a switch 25 and a resource manager 9 conforming to the invention. Each user terminal 22, 23 further includes means 27 for sending and receiving data packets and means 28 for sending requests to use the resources of the satellite 3. The means 28 also constitute means for receiving resources assigned by the resource manager 9. The satellite 3 is a multimedia traffic (IP, ATM, MPEG-2, etc. packets) satellite having a multispot service area. The switch 25 has n input ports and m output ports. A spot is associated with each port.

In each terminal 22 and 23 the data streams are grouped into virtual paths 29, 30 according to their destination spot and their type. Each data packet sent on the virtual path 29, 30 is addressed to a particular terminal 24. For each virtual path, the means 28 send a request to the resource manager 9. After processing the requests, the resource manager 9 sends, via the DAMA controller that it incorporates, an authorization to send, in the form of assigned resources received by the means 28.

FIG. 3 is a functional block diagram of the architecture of the resource manager 9 conforming to the invention. The resource manager 9 can be implemented on board the satellite, on the ground, or partly on board the satellite and partly on the ground, and includes a central entity 12 which includes means 14 for receiving requests 10 sent from a virtual path 4, means 14 and 18 for grouping these requests into request groups each associated with a virtual link, and means 15, 16 and 17 for determining the resources authorized for each request group. The method of determining the authorized resources is described later. The resource manager 9 further includes means 13 for allocating satellite resources to the user terminal associated with the same virtual link and an interface 19 between the central entity 12 and the means 13.

Each request received is associated with a virtual path 4. When the means 14 receive a request from a virtual path, hereinafter denoted R(virtual_path), said means 14 update the field corresponding to that virtual path in the table 18 which holds the current status of the resources required for each virtual path and for each virtual link $LV_i$ for i from 1 to n.

In each "superframe" period, i.e. in each refresh period with a duration to be decided on and which can vary from 100 ms to a few seconds, the means 15, 16 and 17 are activated to compute the authorized resources for each virtual link $LV_i$ using software involving one or more iterations.

The algorithms described below implement the means 15, 16 and 17.

Algorithm P1 Implementing the Means 15

The algorithm P1 distributes the resources of a downlink $D_k$ used by the downlink data streams to the same spot between the virtual links $LV_i$ associated with the same spot. To this end, it computes the load factor $Z_k$ of the downlink $D_k$, i.e. the ratio of the total capacity $C_k$ in terms of resources of the downlink $D_k$ to the sum of the requests, and assigns each LV a fair portion of the resources of that downlink:

1) Compute $S(LV_i)$ which represents the sum of the requests of the virtual link $LV_i$ For i=1 to I "I is the number of LV associated with $D_k$"

$$S(LV_i) = \sum_{\text{virtual\_path} \in LV_i} R(\text{virtual\_path})$$

2) Compute the load factor $Z_k$ $$Zk = Ck / \sum_i S(LV_i)$$

3) Compute the authorized resources $RA(VLC_i)$ for each virtual link $LV_i$

For i=1 to I $RA(LV_i) = \min(1, Z_k) \times S(LV_i)$

Algorithm P2 for Implementing the Means 16

The algorithm P2 distributes the resources of an uplink $M_p$ used by the uplink data streams from the same spot between the virtual links $LV_i$ associated with that spot. To this end, it computes the load factor $Z_p$ of the uplink $M_p$, i.e. the ratio of the total capacity $C_p$ in terms of resources of the uplink $M_p$ to the sum of the authorized resources previously computed, and allocates each LV a fair portion of the resources of the uplink.

1) Compute the load factor $Z_p$ $$Z_p = C_p / \sum_i RA(LV_i)$$

2) Compute the modified authorized resources $RA(LV_i)$

For i=1 to I "I is the number of LV associated with $M_p$"

$RA(LV_i) = \min(1, Z_p) \times RA(LV_i)$

Algorithm P3 for Implementing the Means 15

The algorithm P3 corresponds to a second iteration of the algorithm P1

1) Compute the load factor $Z_k$ $$Z_k = \left(C_k - \sum_v RA(LV_v)\right) / \sum_j S(LV_j)$$

"i runs through all the virtual links associated with $D_k$ that are not constrained on the uplink, i.e. for which the uplink is not fully occupied".

"v runs through all the virtual links associated with $D_k$ that are constrained on their uplink, i.e. for which the uplink is fully occupied".

2) Compute the modified authorized resources $RA(LV_i)$

For k=1 to J

"J is the number of virtual links associated with $D_k$ that are not constrained on their uplink"

$RA(LV_j) = \min(1, Z_k) \times S(LV_j)$

The other authorized resources, i.e. those associated with virtual links associated with $D_k$ which are constrained on their uplink, remain unchanged relative to the computation effected by the algorithm P2.

The authorized resources RA are then updated in the table 19 which is the interface between the entity 12 and the resource assignment means 13.

In the same way, the algorithm P2 can be iterated several times. A new iteration computes authorized resources that are modified only for uplinks suffering from congestion, i.e. for which the load factor $Z_p$ is less than 1.

Algorithm P4 for Implementing the Means 17

The algorithm P4 distributes between the virtual links the resources still available on the uplinks and downlinks that are not constrained after the distributions effected by the algorithms P1, P2 and P3.

For all the downlinks $D_k$ for which $Z_k \geq 1$

1) Compute the underloading factor $X_k$:

$$X_k = \left(C_k - \sum_i RA(LV_v)\right) / \sum_j RA(LV_j)$$

"i runs through all the virtual links associated with $D_k$"

"i runs through only the virtual links associated with $D_k$ that are not constrained on their uplink"

2) Compute the authorized resources resulting from the available capacity $CDA(LV_i)$:

If $X_k > 0$,

For i=1 to J

"J is the number of virtual links LV associated with $D_k$ which are not constrained on their uplink"

$CDA(LV_i) = X_k \times RA(LV_i)$ for all the uplinks j for which $Z_p \geq 1$

3) Compute the underloading factor $X_p$:

$$X_p = \left(C_p - \sum_k RA(LV_k)\right) \bigg/ \sum_k CDA(LV_k)$$

4) Compute the new resources $CDA(LV_i)$:

If Xp<1,

For k=1 to K "K is the number of LV associated with $M_p$"

$$CDA(LV_k) = X_u \times CDA(LV_k)$$

If $X_p$ is less than 1, the corresponding resources CDA are added to the authorized resources RA(LV) in table 19. The corresponding links LV are then considered as constrained on their uplink.

The computation of the CDA on the downlinks is then repeated iteratively until all of the remaining (unconstrained) uplinks are such that $X_p$ is greater than or equal to 1.

The means 13 constitute a DAMA controller known in the art that uses the data in the table 19 to assign effective resources corresponding to the requests that it receives from user terminals.

FIG. 4 shows a data transmission system 21 like that shown in FIG. 2, using a dynamic circuit switch 25. The satellite 3 includes a controller 26 for said switch 25 and a resource manager 9 conforming to the invention as described with reference to FIG. 3.

The combination of the dynamic circuit switch 25 and its controller 26 is a routing unit on board the satellite 3: this unit establishes dynamically routes between the n input ports of the switch 25 and the m output ports of the same switch 25.

When the resource manager 9 sends the means 28 via the DAMA controller an authorization to send in the form of assigned resources, the resource manager 9 sends in parallel a route set-up instruction to the controller 26. Thus each terminal 22, 23 sends on each virtual path 29, 30 at the time indicated in its assigned resources, and the switch 25 has set up beforehand the route requested at the same time, which the resource manager 9 has communicated to it.

From the functional point of view, the system 21 is similar to a packet switching system in which the input ports are access points of the sending terminals and the output ports are access points of the receiving terminals. A satellite switch-time division multiple access (SS-TDMA) switch is perfectly suitable for this.

Of course, the invention is not limited to the embodiment just described.

In particular, the SS-TDMA switch can be replaced by any transparent or regenerative type of circuit switch offering switching performance compatible with use in burst mode, i.e. which can be configured (route set-up instructions) every superframe (from 100 ms to a few seconds) and even burst by burst.

Finally, any means can be replaced with equivalent means without departing from the scope of the invention.

The invention claimed is:

1. A method of managing resources implemented in a resource manager for a satellite telecommunication system including a plurality of user terminals sending data to spots via a satellite, all data streams from a given terminal to the same given destination spot constituting a virtual path comprising a set of uplinks from said terminal to said satellite and a set of downlinks from said satellite to said spot, said manager including a central entity associated with said satellite and including means for receiving requests sent by said user terminals, each request expressing a requirement to use resources of the satellite which correspond to said virtual path, wherein said central entity comprises: means for grouping said requests into request groups each associated with a set of uplinks from the same spot to said destination spot, said set of uplinks constituting a virtual link, said same spot including terminals of said plurality of user terminals of said communication system; and means for determining authorized resources for each request group; which method includes:

a first step of distributing a portion of said resources of said satellite associated with said downlinks used by said downlink streams to the same spot between said virtual links associated with said same spot as a function of a weighting parameter associated with each virtual link in order to generate authorized resources associated with each virtual link; and a second step of distributing said portion of said resources of said satellite associated with said uplinks used by said uplink streams from the same spot between said authorized resources associated with said same spot as a function of a weighting parameter associated with each of said authorized resources so as to generate modified authorized resources associated with each of said authorized resources.

2. The method claimed in claim 1, wherein said central entity includes: means for distributing, on said virtual link, resources that remain available after determination of said authorized resources; and means for determining new authorized resources modified as a function of said distribution of resources still available for each of said virtual links.

3. The method claimed in claim 1, wherein the resource manager includes means for assigning resources of said satellite to user terminals associated with the same virtual link as a function of said authorized resources or said modified authorized resources.

4. The method claimed in claim 1 including a third step of distributing said resources of said satellite still available after said first and second distribution steps to constitute authorized resources modified as a function of said distribution of resources still available for each of said virtual links.

5. The method claimed in claim 4 wherein at least one of said distribution steps is repeated.

6. A data transmission system including user terminals and a satellite including a dynamic circuit switch and a controller for said switch, which system includes the resource manager, as claimed in claim 1, sending data routing set-up instructions to said controller.

* * * * *